United States Patent
Cha

(10) Patent No.: US 7,440,782 B2
(45) Date of Patent: Oct. 21, 2008

(54) HINGE DEVICE FOR A DISPLAY FOR ROTATION TYPE MOBILE PHONE

(75) Inventor: Moon-Young Cha, Seoul (KR)

(73) Assignee: Samsung Electronics Co., Ltd. (KR)

( * ) Notice: Subject to any disclaimer, the term of this patent is extended or adjusted under 35 U.S.C. 154(b) by 502 days.

(21) Appl. No.: 11/185,122

(22) Filed: Jul. 20, 2005

(65) Prior Publication Data

US 2006/0162123 A1 Jul. 27, 2006

(30) Foreign Application Priority Data

Jan. 25, 2005 (KR) ............... 10-2005-0006766

(51) Int. Cl.
*H04M 1/00* (2006.01)

(52) U.S. Cl. ............. 455/575.3; 455/575.1; 455/575.2; 455/575.4; 361/814; 16/239; 16/330; 16/334

(58) Field of Classification Search ............. 455/575.1, 455/575.2, 575.3, 575.4; 361/814; 16/239, 16/334
See application file for complete search history.

(56) References Cited

U.S. PATENT DOCUMENTS

| | | | | |
|---|---|---|---|---|
| 6,708,046 | B1* | 3/2004 | Takagi | 455/575.3 |
| 6,721,420 | B1* | 4/2004 | Kubo et al. | 379/433.13 |
| 6,957,083 | B2* | 10/2005 | Ikeda et al. | 455/556.1 |
| 7,054,669 | B2* | 5/2006 | Ito | 455/566 |
| 7,055,219 | B2* | 6/2006 | Shiba | 16/367 |
| 7,117,564 | B2* | 10/2006 | Jeong | 16/334 |
| 7,174,195 | B2* | 2/2007 | Nagamine | 455/575.1 |
| 2001/0011029 | A1* | 8/2001 | Iwabuchi et al. | 455/566 |
| 2002/0142810 | A1* | 10/2002 | Kawasaki et al. | 455/566 |
| 2003/0078077 | A1* | 4/2003 | Kukubo | 455/566 |
| 2003/0119562 | A1* | 6/2003 | Kokubo | 455/566 |
| 2003/0144036 | A1* | 7/2003 | Ito | 455/566 |
| 2003/0153372 | A1* | 8/2003 | Shimamura et al. | 455/575 |
| 2003/0203747 | A1* | 10/2003 | Nagamine | 455/575.3 |
| 2004/0016058 | A1* | 1/2004 | Gardiner et al. | 7/119 |
| 2004/0072589 | A1* | 4/2004 | Hamamura et al. | 455/550.1 |
| 2004/0075620 | A1* | 4/2004 | Tanaka et al. | 345/1.1 |
| 2004/0198457 | A1* | 10/2004 | Hayashida et al. | 455/566 |
| 2004/0198476 | A1* | 10/2004 | Aikawa et al. | 455/575.3 |
| 2004/0203535 | A1* | 10/2004 | Kim et al. | 455/90.3 |
| 2004/0204064 | A1* | 10/2004 | Ikeda et al. | 455/556.1 |
| 2004/0222980 | A1* | 11/2004 | Lee | 345/184 |
| 2004/0259530 | A1* | 12/2004 | Ishizawa et al. | 455/411 |
| 2005/0024339 | A1* | 2/2005 | Yamazaki et al. | 345/169 |

(Continued)

*Primary Examiner*—Matthew Anderson
*Assistant Examiner*—Hai V Nguyen
(74) *Attorney, Agent, or Firm*—The Farrell Law Firm, PC

(57) ABSTRACT

Disclosed is a hinge device for a display rotation type mobile phone comprising a main housing, a folder having a main display device and rotatable around a first hinge axis extending in a direction perpendicular to the length of the main housing and a connection member for rotatably connecting the folder to the main housing, said hinge device including a first hinge member; a second hinge member connected to the first hinge member which allows and restricts the rotation of the second hinge member; a swing washer interposed between the first and second hinge members to rotatably connect the second hinge member to the first hinge member and providing an elastic force acting to rotate the folder; and a swing bush engaged into the first hinge member sequentially connected to the swing washer and the second hinge member.

12 Claims, 14 Drawing Sheets

U.S. PATENT DOCUMENTS

| | | |
|---|---|---|
| 2005/0041035 A1* | 2/2005 | Nagatomo et al. .......... 345/601 |
| 2005/0083642 A1* | 4/2005 | Senpuku et al. ............. 361/681 |
| 2005/0090297 A1* | 4/2005 | Yang et al. ............... 455/575.3 |
| 2005/0099533 A1* | 5/2005 | Matsuda et al. ............. 348/375 |
| 2005/0119023 A1* | 6/2005 | Sudo et al. ............... 455/550.1 |
| 2005/0136999 A1* | 6/2005 | Jeon ........................ 455/575.3 |
| 2005/0141686 A1* | 6/2005 | Matsunaga et al. ..... 379/142.01 |
| 2005/0151830 A1* | 7/2005 | Yamazaki ................... 347/238 |
| 2005/0153679 A1* | 7/2005 | Kim .......................... 455/403 |
| 2005/0164745 A1* | 7/2005 | Oe et al. ...................... 455/566 |
| 2005/0176481 A1* | 8/2005 | Jeong ...................... 455/575.7 |
| 2005/0236869 A1* | 10/2005 | Ka et al. ...................... 296/192 |
| 2005/0287953 A1* | 12/2005 | Ikeda et al. ................ 455/66.1 |
| 2006/0035680 A1* | 2/2006 | Kokubo ...................... 455/566 |
| 2006/0211457 A1* | 9/2006 | Otsuka ..................... 455/575.1 |
| 2006/0230579 A1* | 10/2006 | Ko et al. ....................... 16/330 |
| 2006/0293088 A1* | 12/2006 | Kokubo ...................... 455/566 |
| 2007/0056117 A1* | 3/2007 | Gardiner et al. ................ 7/119 |

* cited by examiner

HINGE DEVICE FOR A DISPLAY FOR ROTATION TYPE MOBILE PHONE

PRIORITY

This application claims priority to an application entitled "Hinge Device for Display Rotation Type Mobile Phone" filed with the Korean Intellectual Property Office on Jan. 25, 2005 and assigned Serial No. 2005-6766, the contents of which are incorporated herein by reference.

BACKGROUND OF THE INVENTION

1. Field of the Invention

The present invention relates to a plate-type hinge device for a display for a rotation type mobile phone comprising main and sub-display devices.

2. Description of the Related Art

Generally, the term "mobile communication terminals" refer to mobile phones or handheld devices used for mobile wireless communications. The mobile communication terminals are classified into a bar type, a flip type and a folder type according to their construction. A bar-type mobile terminal has a bar-shaped single housing. A flip-type mobile terminal has a bar-shaped housing and a flip rotatably connected to the housing by a hinge. A folder-type mobile terminal has a bar-shaped housing and a folder rotatably connected to the housing by a hinge.

Recently, new designs such as a rotation (or swing) type and a slide type have been developed to meet the diverse needs and tastes of users. The rotation type has a pair of facing housings, one of which is rotatable on the other housing. The slide type has a pair of housings, one of which slides in relation to the other housing in a longitudinal direction to open or close the terminal. Such diverse types of mobile communication terminals are easily understandable by those skilled in the relevant art.

Mobile communication terminals with small and light designs have gained popularity for their improved portability. These small and light terminals are more convenient during a voice call or video-conference.

As illustrated in FIGS. 1 to 3, a conventional mobile phone in display rotation type comprises a main housing 10 with a first hinge axis A1, a folder 20 and a connection member 30. The main housing 10 is provided with a plurality of key buttons 11 and a microphone 12. The connection member 30 connects the folder 20 to the main housing 10 in such a manner that the folder 20 can rotate around the first hinge axis A1 in a direction to be closer to or away from the front surface of the main housing 10. The connection member 20 has a second hinge axis A2 around which the folder 20 can rotate in contact with the connection member 20. The folder 20 comprises an LCD 21 and speakers 22.

The connection member 30 also has a hinge module 40 mounted therein to make the folder 20 rotatable around the second hinge axis A2.

To better view moving images, video or mobile game images, a user can rotate the display device of the folder 20 in a direction providing a wider display (i.e., a landscape display mode).

However, such a conventional rotation type mobile phone has a single display device on the internal surface of the folder. When the folder is closed, the display device cannot be used. If an additional display device is provided on the external surface of the folder, the size and thickness of the hinge module is increased, an undesirable side effect in light of consumer demand for smaller and lighter terminals. In addition, such an additional display device will limit design variations and improvements for mobile phones.

SUMMARY OF THE INVENTION

Accordingly, the present invention has been made to solve the above-mentioned problems occurring in the prior art, and an object of the present invention is to provide a plate-type hinge device with reduced size and thickness which is useful for a display rotation type mobile phone comprising main and sub-display devices and which meets the demand for a slim and small mobile phone design.

Another object of the present invention is to provide a hinge device for a display rotation type mobile phone, which has both rotation and stopper functions, thereby reducing the number of parts to manufacture the mobile phone in a slim design and reducing the manufacture cost.

To accomplish the above objects of the present invention, there is provided a hinge device for a display rotation type mobile phone including a main housing, a folder having a main display device and rotatable around a hinge axis extending in a direction perpendicular to the length of the main housing and a connection member for rotatably connecting the folder to the main housing, said hinge device including: a first hinge member; a second hinge member rotatably connected to the first hinge member; a swing washer interposed between the first and second hinge members to rotatably connect the second hinge member to the first hinge member and providing an elastic force acting to rotate the folder; and a swing bush engaged into the first hinge member sequentially connected to the swing washer and the second hinge member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
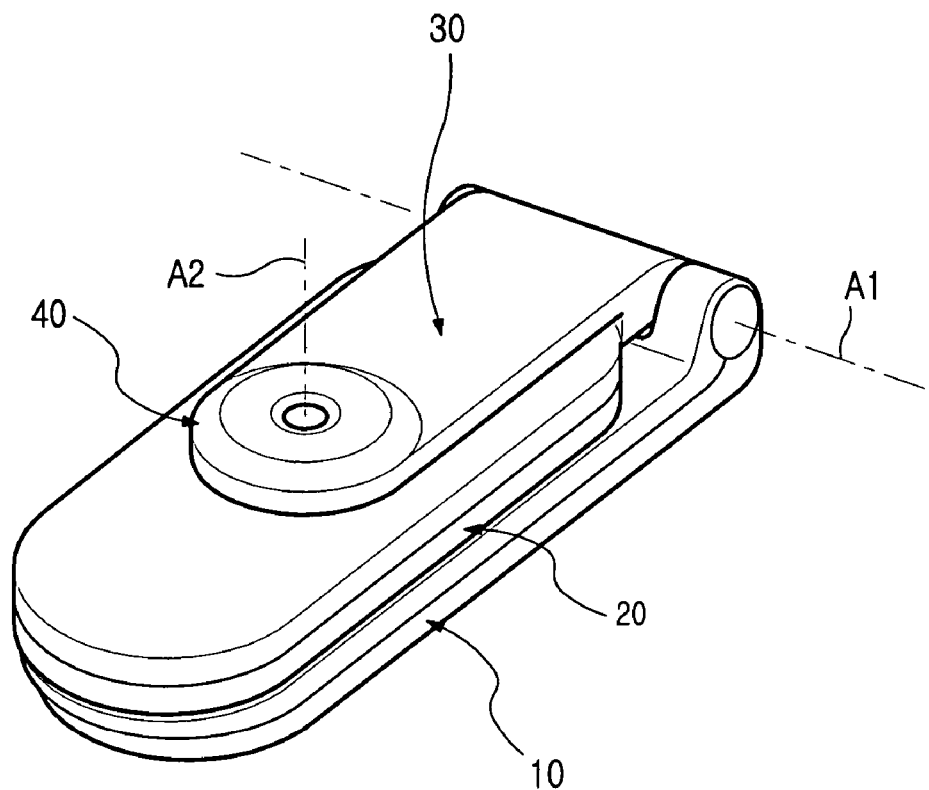
FIG. 1 is a perspective view of a conventional rotation type mobile phone in closed state.
Figure 2:
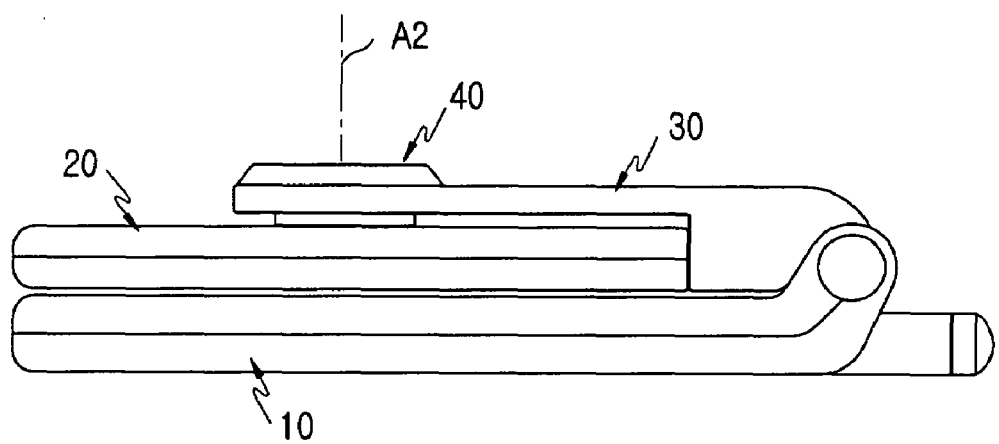
FIG. 2 is a side view of the mobile phone in FIG. 1.
Figure 3:
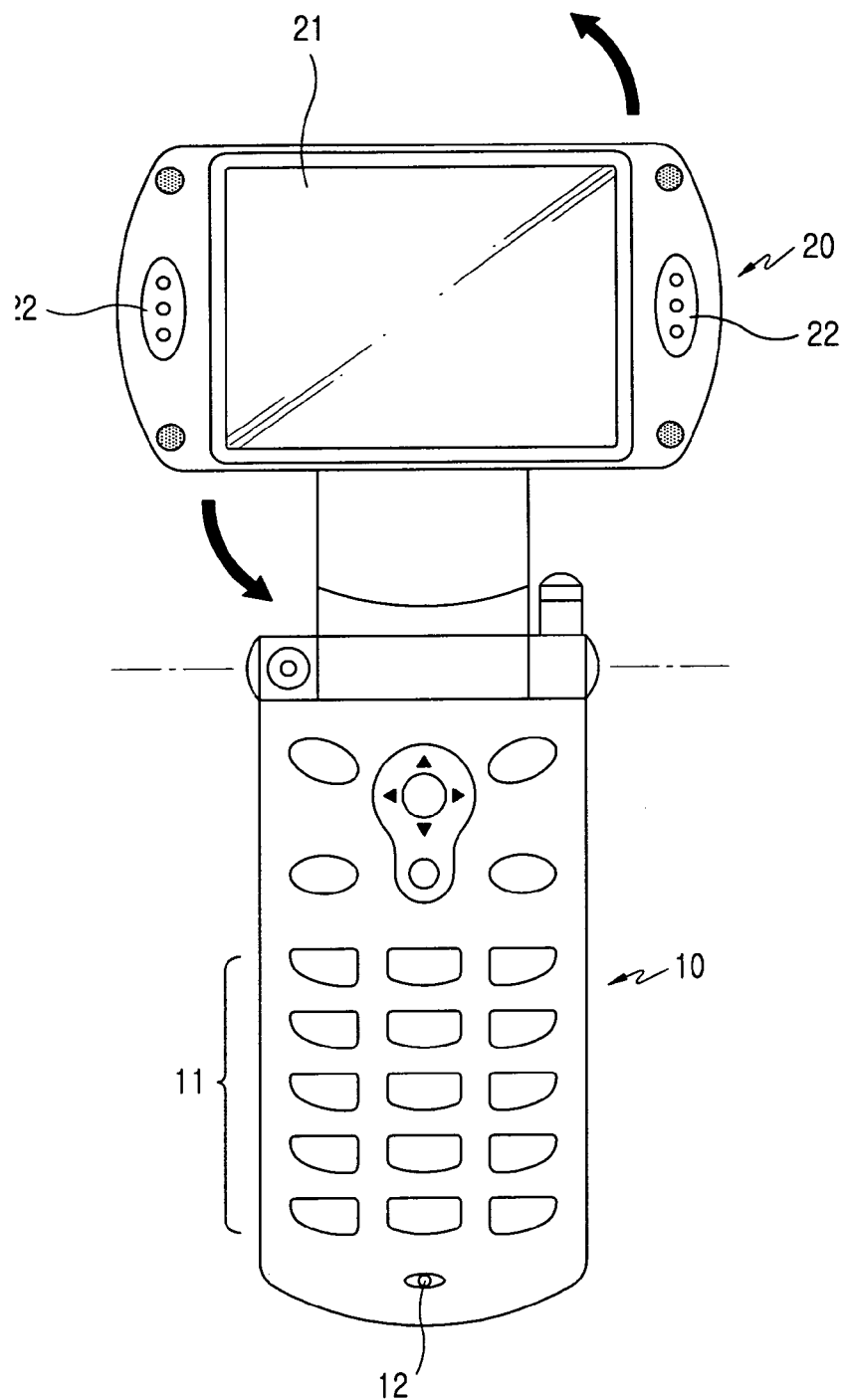
FIG. 3 is a plan view of the conventional rotation type mobile phone of FIG. 1 in an opened state with a 90° swiveled folder.

Hereinafter, preferred embodiments of the present invention will be described with reference to the accompanying drawings. In the drawings, the same elements, although depicted in different drawings, will be designated by the same reference numeral or character. Also, in the following description of the present invention, a detailed description of known functions and configurations incorporated herein will be omitted when it may make the subject matter of the present invention unclear.

Figure 4:
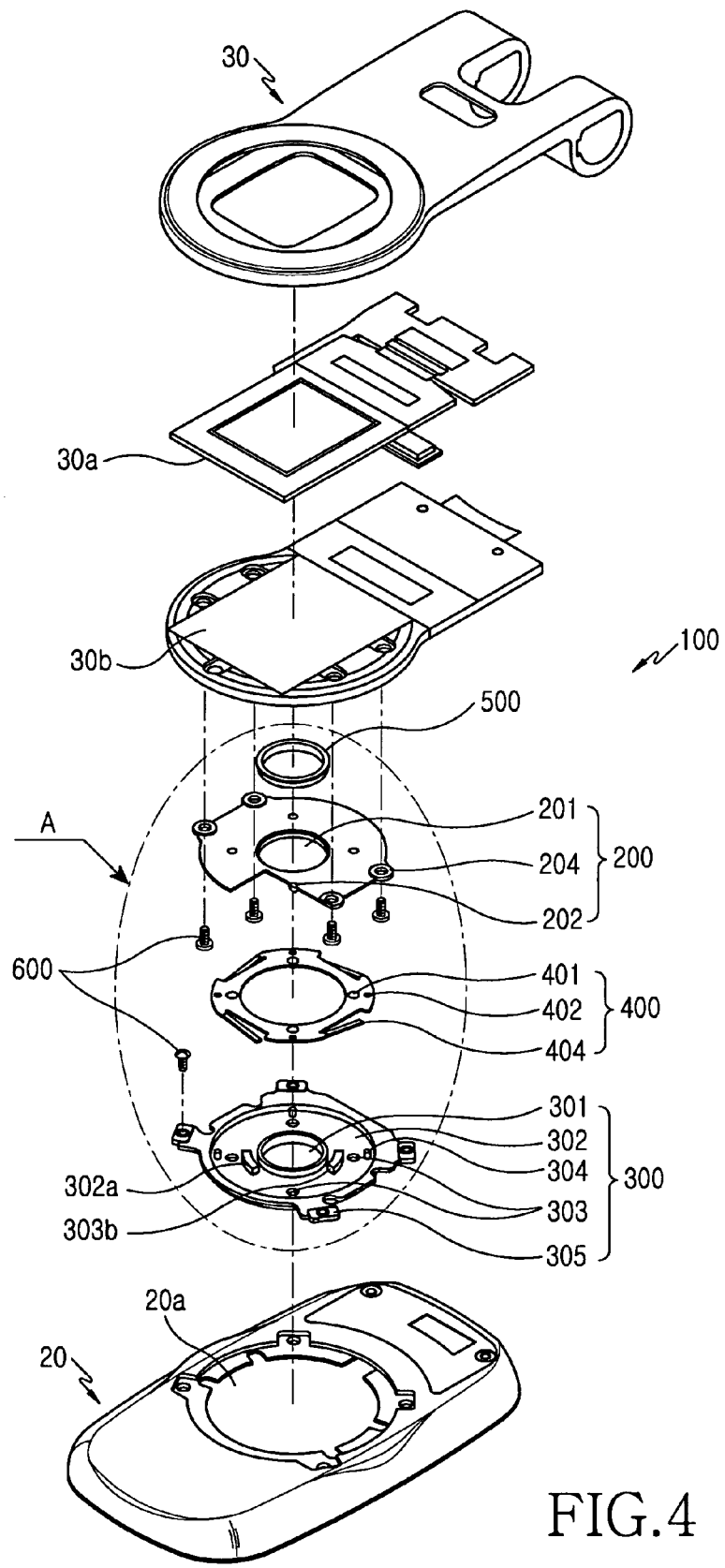
FIG. 4 is an exploded perspective view of a hinge device used for a display rotation type mobile phone according to an embodiment of the present invention.
Figure 5:
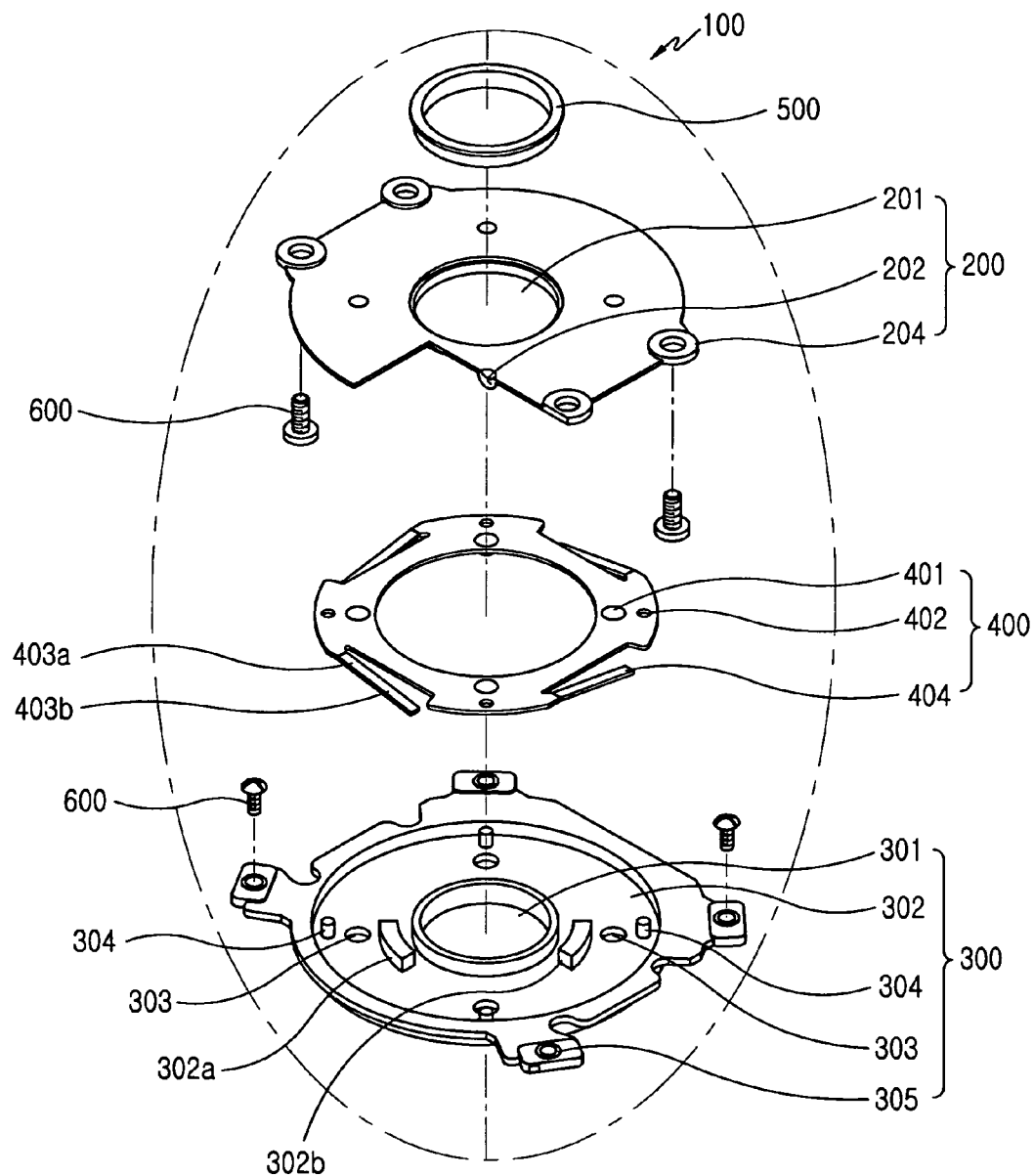
FIG. 5 is an enlarged and exploded perspective view of part A in FIG. 4.

As illustrated in FIGS. 4 and 5, a hinge device 100 comprises first and second hinge members 200 and 300, a swing washer 400 and a swing bush 500. The first hinge member 200 is mounted underneath a connection member 30 extending in a longitudinal direction. The connection member 30 has a disc-shaped mount panel 30b under which the first hinge member 200 can be mounted. The second hinge member 300 is fitted into a connection hole 20a formed on a folder 20. The swing washer 400 facing the first hinge member 200 connects the second hinge member 300 rotatably to the first hinge member 200. The swing washer 400 interposed between the first hinge member 200 and the second hinge member 300 provides an elastic force acting to rotate the folder 20. The swing bush 500 is engaged into the first hinge member sequentially coupled to the swing washer 400 and the second hinge member 300.

Figure 6:
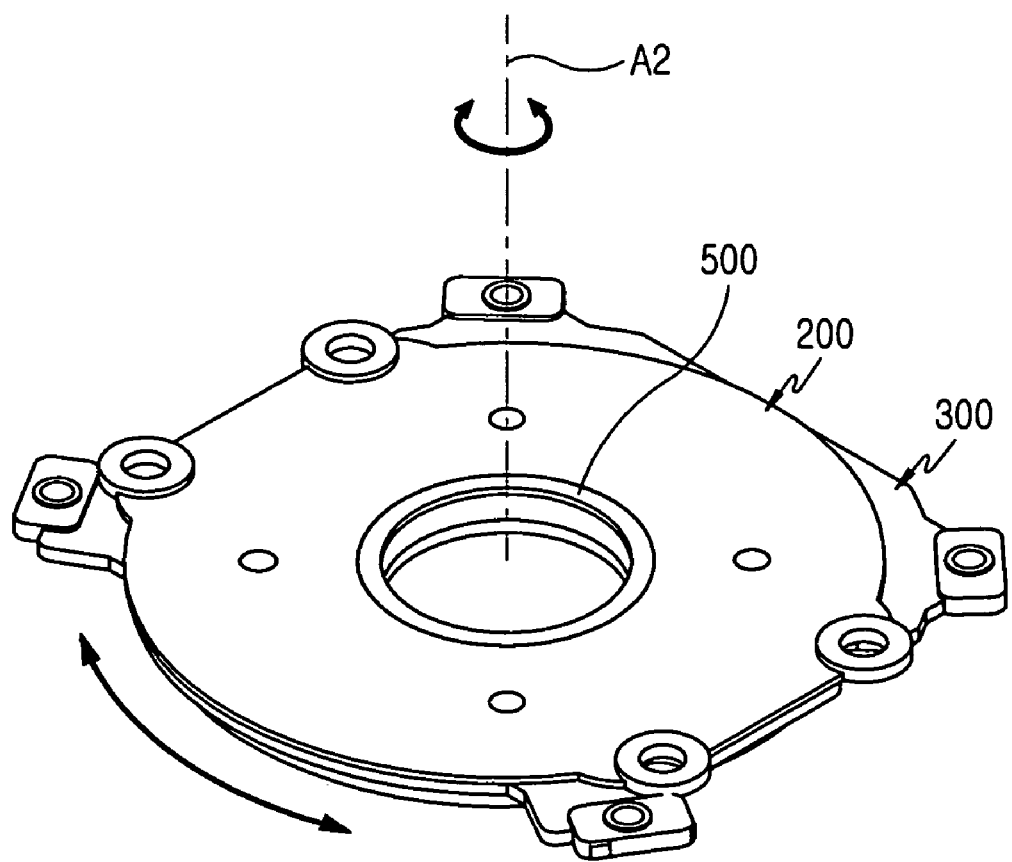
FIG. 6 is a perspective view showing the assembly of a hinge device for a display rotation type mobile phone according to an embodiment of the present invention.
Figure 7:
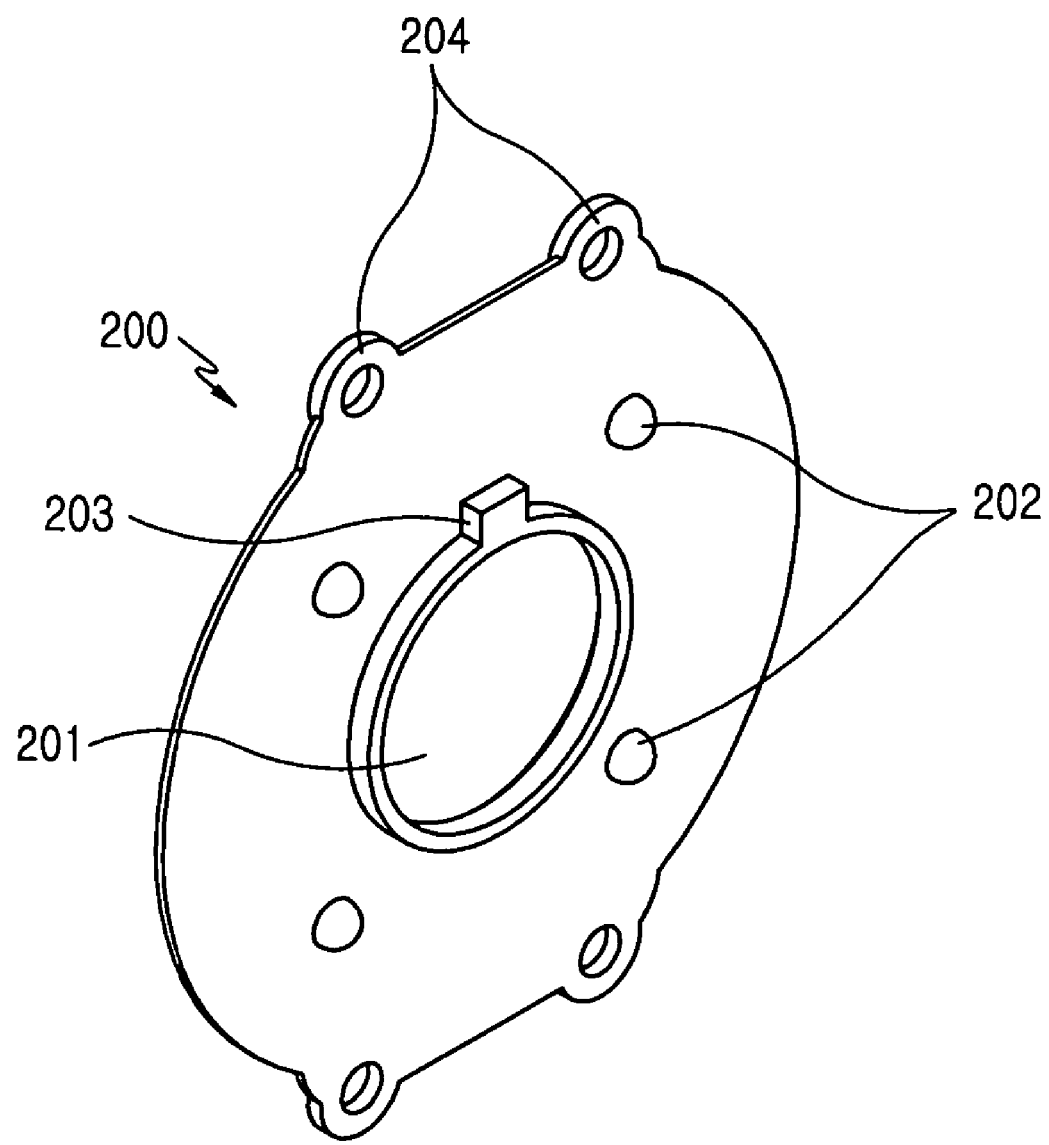
FIG. 7 is a perspective view showing the rear side of a first hinge member of a hinge device used for a display rotation type mobile phone according to an embodiment of the present invention.
Figure 8:
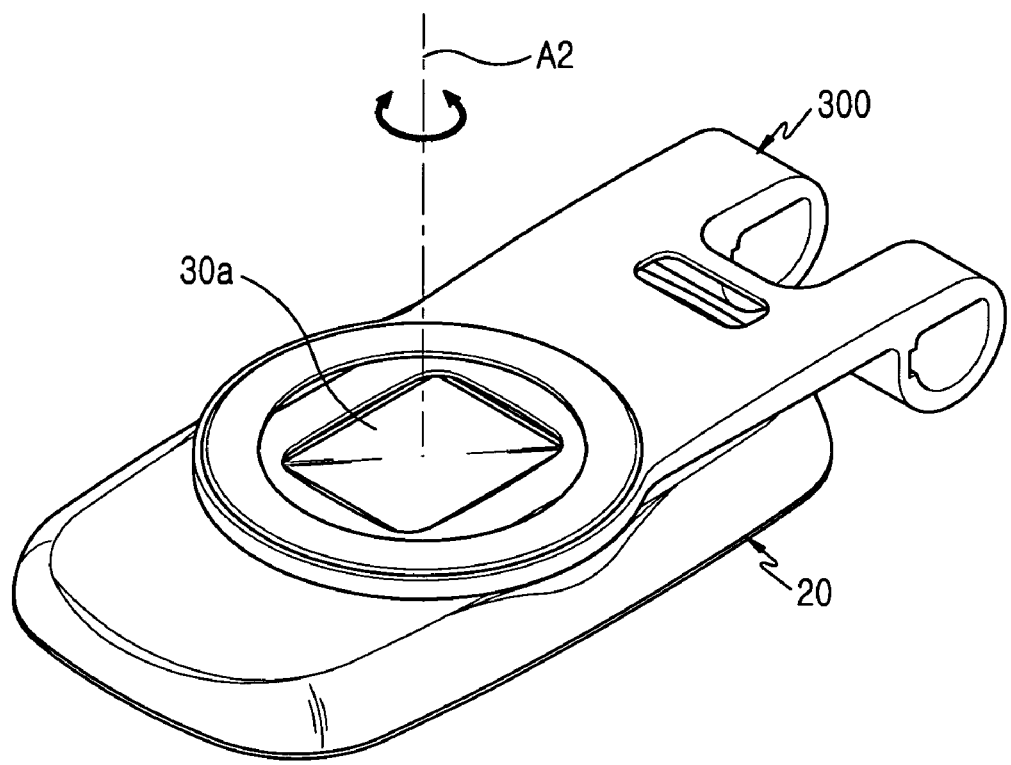
FIG. 8 is a perspective view of a hinge device of a display rotation type mobile phone according to an embodiment of the present invention when a folder is not swiveled.
Figure 9:
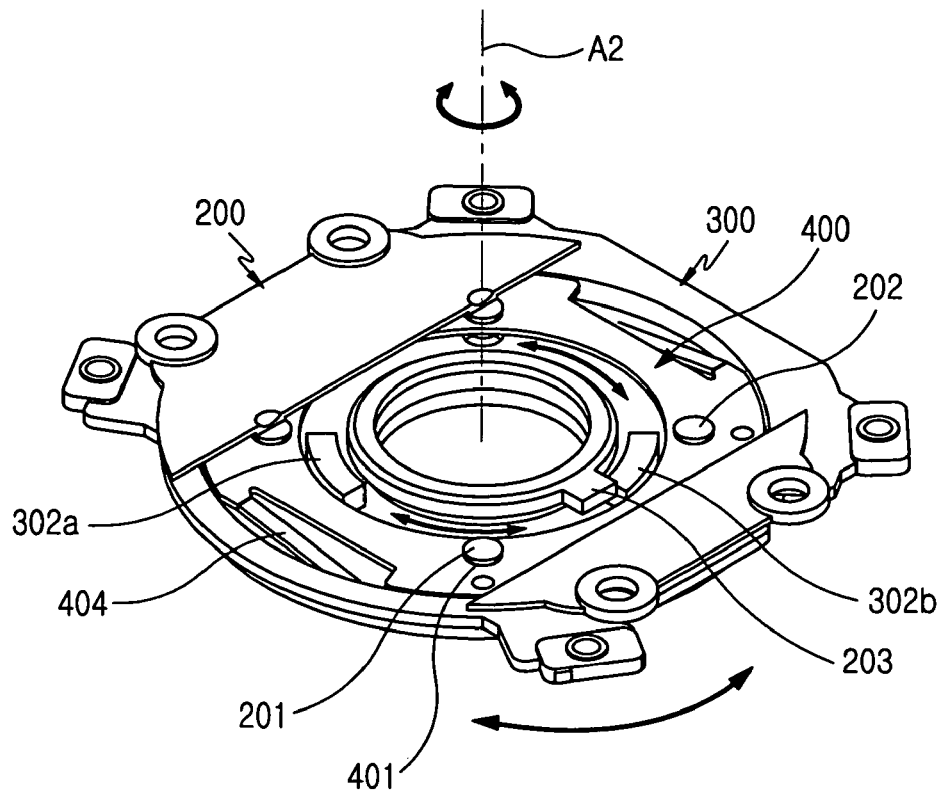
FIG. 9 is a fragmentary perspective view of a hinge device of a display rotation type mobile phone according to an embodiment of the present invention when a folder is not swiveled.
Figure 10:
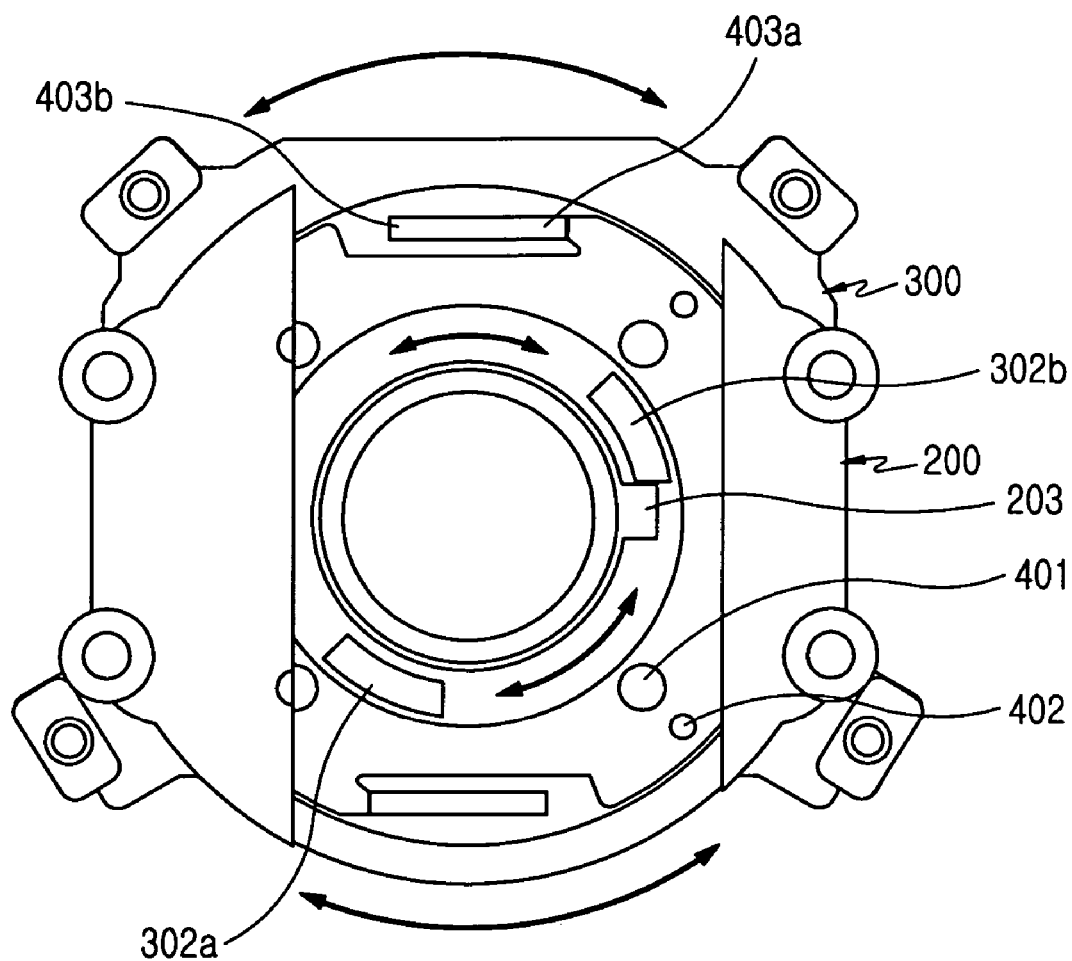
FIG. 10 is a plan view of the hinge device in FIG. 9.

As illustrated in FIGS. 4, 6 and 7, the first hinge member 200 has a through hole 201, a plurality of washer projections 202, a stopper projection 203 and a plurality of screw connection portions 204. The through hole 201 is formed at the center of the first hinge member 200 so that the swing bush 500 can be engaged therein. The washer projections 202 are preferably spaced at equiangular intervals along the circumference of the through hole 201. The washer projections 202 in a domelike shape are smoothly inserted into or released out from washer recesses formed on the swing washer 400 according to the rotation of the folder 20. The stopper projection 203 is formed at a specific position of the periphery of the through hole 201 to restrict the rotation of the second hinge member 300 by interrupting first and second stopper portions 302a and 302b formed on the second hinge member 300. The screw connection portions 204 are formed at the periphery of the first hinge member 200 to secure the first hinge member 200 to the connection member 30 by means of screws 600.

As illustrated in FIGS. 4 and 8-10, the second hinge member 300 has a through hole 301, a washer receiving groove 302, a plurality of washer fixing holes 303 and a plurality of fixing projections 304. The through hole 301 is formed at the center of the second hinge member 300. The washer receiving groove 302 is formed along the outer circumference of the through hole 301 to receive the swing washer 400. The swing washer 400 is received in the washer receiving groove 302, with the insertion of washer recesses 401 projected downward from the swing washer 400 into the washer fixing holes 303. The washer fixing holes 303 are formed at equiangular intervals on the surface of the washer receiving groove 302 along the outer circumference of the through hole 301. The fixing projections 304 are formed adjacent to the washer fixing holes 303 to be inserted and fixed into fixing holes 402.

Figure 12:
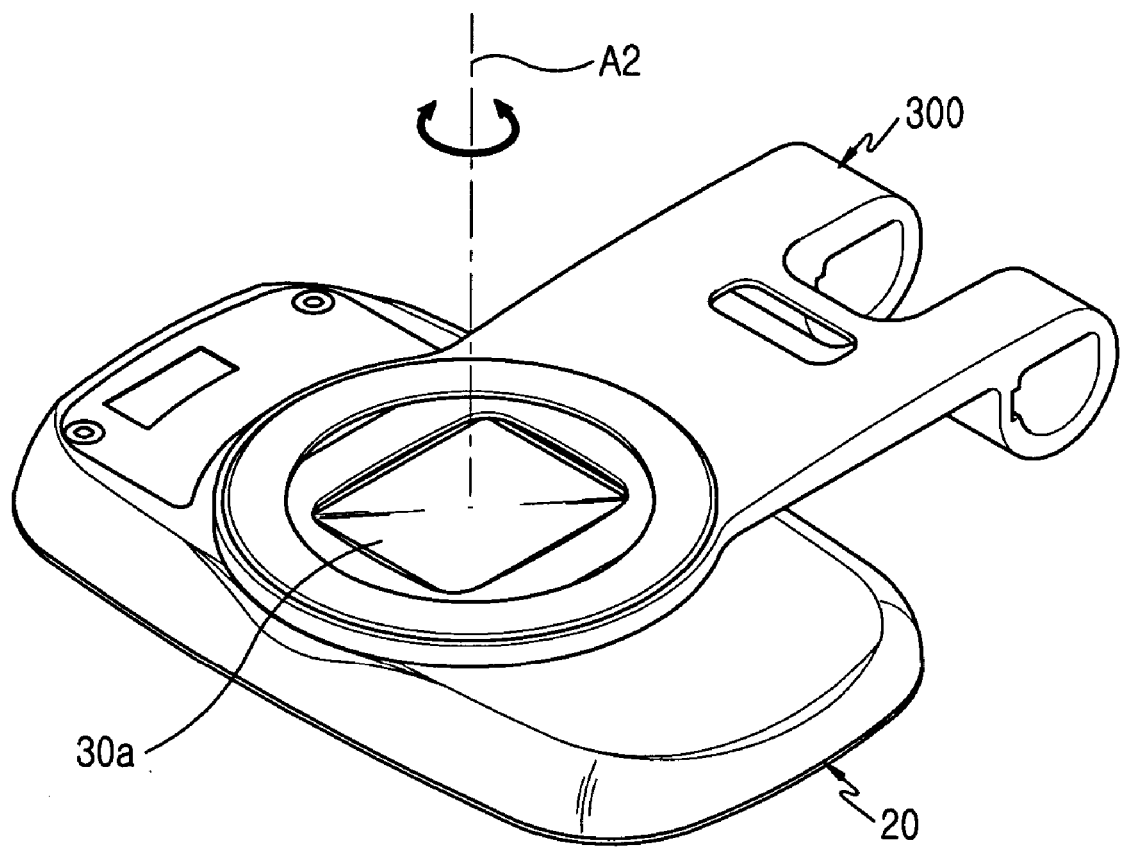
FIG. 12 is a perspective view of a hinge device of a display rotation type mobile phone according to an embodiment of the present invention when a folder is swiveled 90°.
Figure 13:
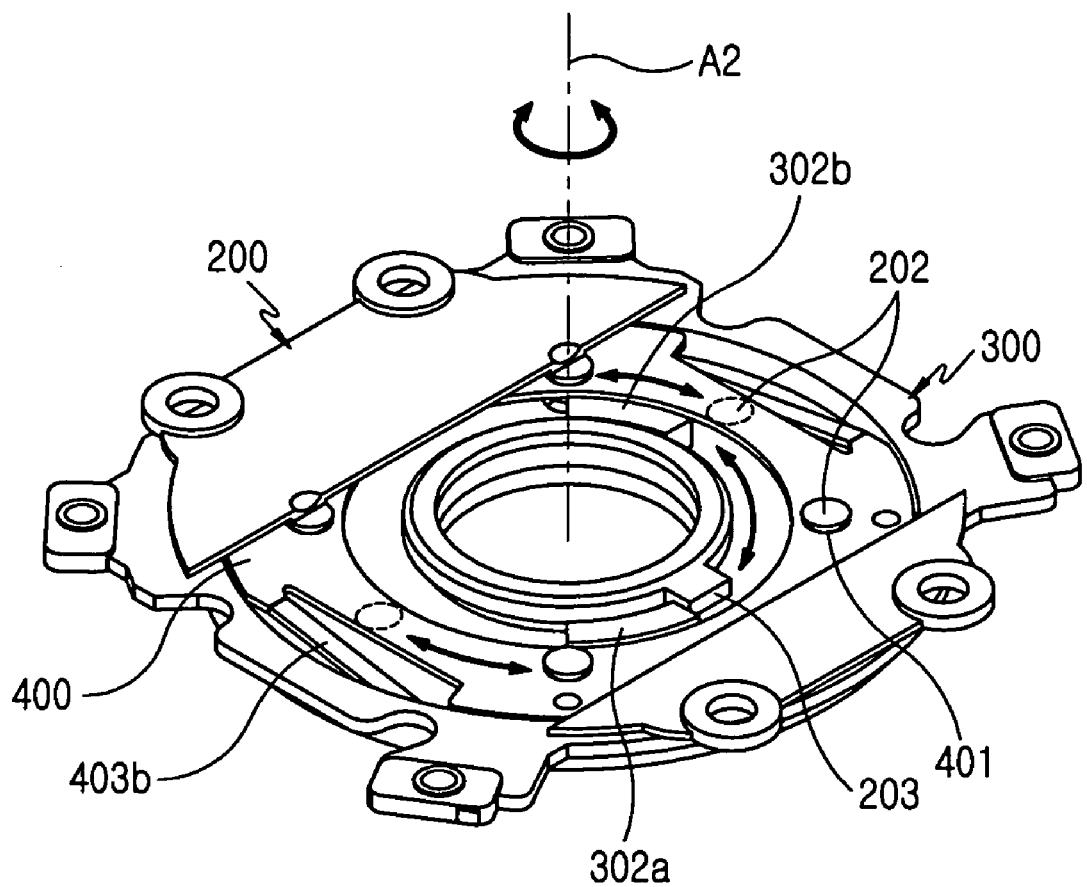
FIG. 13 is a perspective view, partially in cross section, showing a hinge device of a display rotation type mobile phone according to an embodiment of the present invention when a folder is swiveled.
Figure 14:
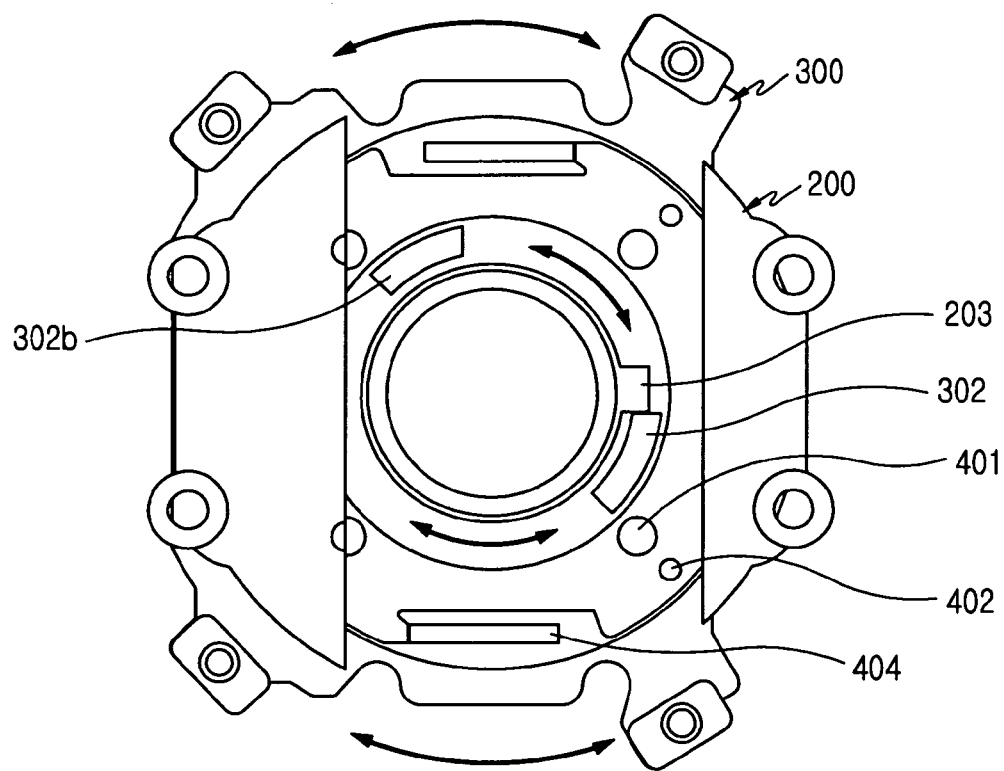
FIG. 14 is a plan view of the hinge device in FIG. 13.

As illustrated in FIGS. 12-14, the second hinge member 300 has the first and second stopper portions 302a and 302b on the surface of the washer receiving groove 302. If the second hinge member 300 is turned clockwise about the hinge axis A2, the first stopper portion 302a will be interrupted by the stopper projection 203 of the first hinge member 200 where the swing washer 400 is turned 90 degrees. If the second hinge member 300 is turned counterclockwise about the hinge axis A2, the second stopper portion 302b will be interrupted by the stopper projection 203 of the first hinge member 200 where the swing washer is returned to its original position.

In addition, a plurality of screw connection portions 305 are formed at the periphery of the second hinge member 300 to secure the second hinge member 300 to the folder 20 by means of screws 600.

Figure 11:
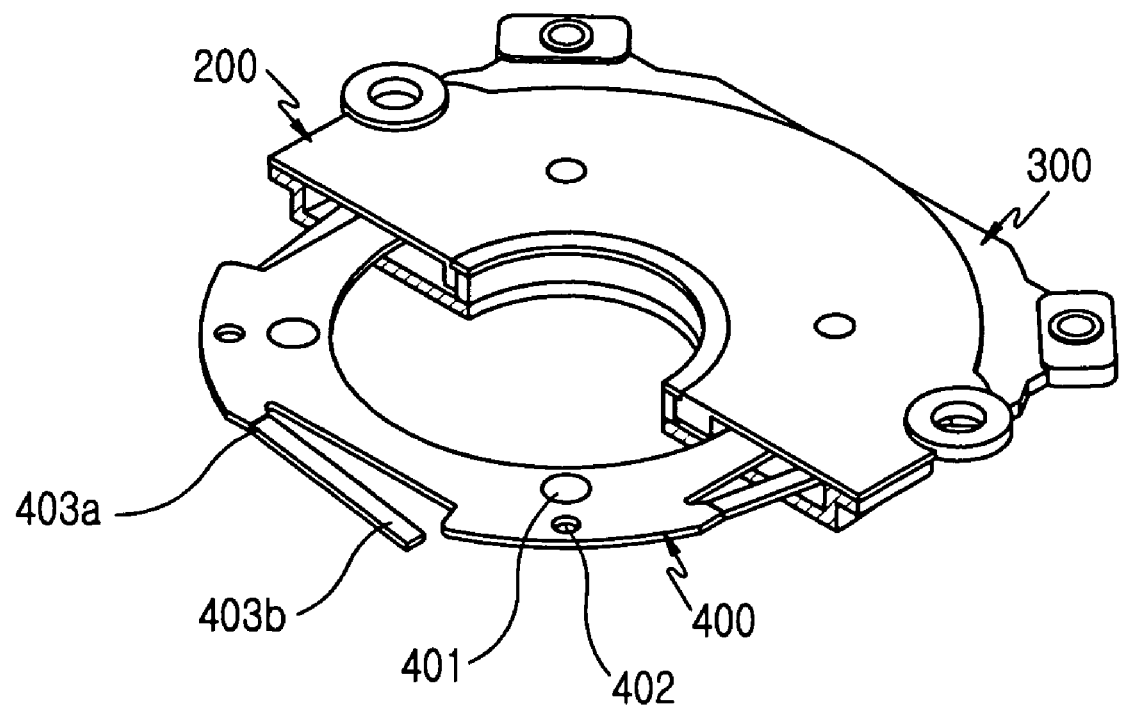
FIG. 11 is a perspective view, partially in cross section, showing a swing washer of a hinge device used for a display rotation type mobile phone according to an embodiment of the present invention.

As illustrated in FIGS. 5 and 11, the swing washer 400 has a plurality of washer recesses 401, a plurality of fixing holes 402 and a plurality of elastic members 403. The washer projections 202 of the first hinge member 200 are inserted into the washer recesses 401 which are spaced at equiangular intervals on the swing washer 200. In addition, the fixing projections 304 of the second hinge member 300 are inserted into the fixing holes 402 formed adjacent to the washer recesses 401. The elastic members 403 are provided at equiangular intervals along the circumference of the swing washer 400 to provide an elastic force acting to rotate the second hinge member 300.

As illustrated in FIG. 11, the elastic members 403 are preferably plate springs each having a fixed end 403a and a free end 403b. The fixed end 403a of the plate spring is fixed to the swing washer 400. The free end 403b is protruded downward in the same direction of the hinge axis A2 to apply pressure to the bottom surface of the washer receiving groove 302. The elastic members 403, i.e., the plate springs, are disposed symmetrically with respect to the hinge axis A2.

As illustrated in FIG. 12, when the user turns the folder 20 about the hinge axis A2, the folder 20 is placed in a direction perpendicular to the length of the connection member 30. At this time, the connection member 30 with the folder 20 turned has a T-shape, or a "⊥" shape.

Hereinafter, the operation of the hinge device for a display rotation type mobile phone having the above structure will be explained in detail with reference to FIGS. 4-14.

Referring to FIGS. 4 and 5, in the hinge device 100 for a display rotation type mobile phone, the first hinge member 200 is sequentially connected to the swing washer 400 and the second hinge member 300. In this condition, the swing bush 500 is engaged into the first hinge member 200. The second hinge member 300 is secured onto the folder 20 having a main display device 21 by tightening up the screws 600 into a plurality of screw connection portions 305.

As illustrated in FIG. 4, the first hinge member 200 is secured to the connection member 30 having a sub-display device 30a by tightening up the screws 600 into a plurality of screw connection portions 204. The connection member 30 has a disc-shaped mount panel 30b under which the first hinge member 200 is mounted.

When the folder 20 is turned 90 degrees clockwise around the hinge axis A2 as illustrated in FIG. 12, the second hinge member 300 is turned together as illustrated in FIGS. 13 and 14. At this time, the swing washer 400 is also turned.

As illustrated in FIG. 13, the washer projections 202 of the first hinge member 200 are inserted into the washer recesses. With the turning of the swing washer 400, the washer recesses 401 release from the initially received washer projections 202 and move to receive the next washer projections 202.

As illustrated in FIG. 14, the washer projections 22 are spaced at equiangular intervals along the outer circumference of the through hole 201 of the first hinge member 200. The washer recesses 401 are also spaced at equiangular intervals so that the washer projections 22 can be inserted into the facing washer recesses 401.

As illustrated in FIG. 13, the washer projections 202 are formed in a domelike shape to be smoothly inserted into, and released out from, the washer recesses 401.

Also, as illustrated in FIG. 11, the elastic members 403 formed on the swing washer 400 provide a clamping force acting to place the washer recesses 401 to receive the corresponding washer projections 202. The elastic members 403 are preferably plate springs formed at equiangular intervals along the periphery of the swing washer 400. Each plate spring 403 has one end 403a fixed to the swing washer 400 and the other end 403b which is a free end protruded downward in the same direction of the hinge axis A2 to apply pressure to the bottom surface of the washer receiving groove 302.

When the folder 20 is turned, the second hinge member 300 is also turned until the first stopper portion 302a is interrupted by the stopper projection 203 of the first hinge member 200. At this time, the connection member 30 with the folder 20 turned has an upside-down T-shape, or a "⊥" shape as shown in FIG. 12. If the folder 20 is turned around the hinge axis A2 in a reverse direction, the second hinge member 300 and the swing washer 400 turn together. Then, the washer recesses 401 will move to receive the next washer projections 202. The second hinge member 300 turns until the second stopper section 302b is interrupted by the stopper projection 203 of the first hinge member 200 as shown in FIG. 12.

Consequently, the folder 20 is returned to its original position and direction. Since the plate springs 403 apply a clamping force on the washer recesses 401 receiving the washer projections 202, the folder 20 can be maintained in its original position and direction.

As explained above, a hinge device for a display for a rotation type mobile phone is provided in a plate shape having a sub-display device. The hinge device improves efficiency and ease of use. As compared to a conventional hinge module, the hinge module according to the present invention has reduced size and thickness, thereby enabling a slim and small mobile phone design. Moreover, the hinge member having both rotation and stopper functions can reduce the number of parts to manufacture the mobile phone with a slim design.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof. The hinge device according to the present invention can be used for any handheld mobile terminals.

What is claimed is:

1. A hinge device for a rotation type mobile phone including a main housing, and a folder having a main display device and rotatable around a first hinge axis extending in a direction perpendicular to a length of the main housing, said hinge device comprising:

a connection member rotatably connecting the folder to the main housing, the connection member coupled to the folder so that the folder rotates about a second hinge axis perpendicular to the first hinge axis between a first position and a second position, the connection member having a sub-display device exposed at the first and second positions;

a first hinge member;

a second hinge member connected to the first hinge member in such a manner that allows and restricts the rotation of the second hinge member;

a swing washer interposed between the first and second hinge members to rotatably connect the second hinge member to the first hinge member and providing an elastic force acting to rotate the folder; and a swing bush engaged into the first hinge member sequentially connected to the swing washer and the second hinge member.

2. The hinge device as claimed in claim 1, wherein said connection member further has a disc-shaped mount panel provided below the sub-display device to mount the first hinge member thereunder, and wherein said folder additionally has a connection hole into which the second hinge member is fitted.

3. The hinge device as claimed in claim 1, wherein said first hinge member includes:

a through hole formed at the center thereof;

a plurality of washer projections formed at equiangular intervals along an outer circumference of the through hole;

a stopper projection formed at a predetermined position on a periphery of the through hole; and a plurality of screw connection portions formed at a periphery of the first hinge member to secure the first hinge member to the connection member by screws.

4. The hinge device as claimed in claim 1, wherein said second hinge member includes:

a through hole formed at the center thereof;

a washer receiving groove formed along an outer circumference of the through hole to receive the swing washer and restrict rotation of the first hinge member;

a plurality of washer fixing holes formed at equiangular intervals on the surface of the washer receiving groove along the outer circumference of the through hole to receive washer recesses of the swing washer; and a plurality of fixing projections formed adjacent to the washer fixing holes to be inserted and fixed into fixing holes formed on the swing washer.

5. The hinge device as claimed in claim 4, wherein said washer receiving groove includes on a surface thereof:

a first stopper portion interrupted by the stopper projection of the first hinge member where the swing washer is turned 90 degrees when the second hinge member is turned around a second hinge axis of the connection member; and a second stopper portion interrupted by the stopper projection of the first hinge member where the swing washer is returned to its original position when the second hinge member is turned about the second hinge axis in a reverse direction.

6. The hinge device as claimed in claim 4, wherein said swing washer includes:

a plurality of washer recesses formed at equiangular intervals on a surface thereof to receive facing washer projections of the first hinge member;

a plurality of fixing holes formed adjacent to the washer recesses to receive the fixing projections of the second hinge member; and a plurality of elastic members formed at equiangular intervals along a circumference of the swing washer to provide an elastic force acting to rotate the second hinge member.

7. The hinge device as claimed in claim 6, wherein said elastic members are plate springs each having one end fixed to the swing washer and an other end which is a free end protruding downward in the direction of the second hinge axis to apply pressure to the bottom surface of the washer receiving groove.

8. The hinge device as claimed in claim 7, wherein said plate springs are disposed symmetrically with respect to the second hinge axis.

9. The hinge device as claimed in claim 4, wherein, when the folder is turned 90 degrees around the second hinge axis, said second hinge member turns and causes the swing washer received in the washer receiving groove to be turned together until the first stopper portion is interrupted by the stopper projection of the first hinge member, with the turning of the swing washer, the washer recesses releasing from the initially received washer projections of the first hinge member and moving to receive next washer projections and the plate springs formed at the periphery of the swing washer providing a clamping force to place the washer recesses to receive the next washer projections, when the folder is turned 90 degrees around the second hinge axis in a reverse direction, said second hinge member and said swing washer turn together in the reverse direction until the second stopper portion is interrupted by the stopper projection of the first hinge member and the second hinge member and the swing washer return to the original positions thereof.

10. The hinge device as claimed in claim 1, wherein said second hinge member further includes a plurality of screw connection portions formed at a periphery thereof to be secured to the folder by screws.

11. The hinge device as claimed in claim 1, wherein said folder, when turned about the second hinge axis, is placed in a direction perpendicular to the length of the connection member so that the connection member with the folder turned has a "⊥" shape.

12. A hinge device for a rotation type mobile phone having a main housing, and a folder having a main display device and rotating about a first hinge axis, the hinge device comprising:

a connection member rotatably connecting the folder to the main housing, the connection member coupled to the folder so that the folder rotates about a second hinge axis perpendicular to the first hinge axis between a first position and a second position, the connection member having a sub-display device exposed at the first and second positions; and a plate-type hinge module for connecting the folder to the connection member and including predetermined parts for performing both rotation and stopper functions.

* * * * *